United States Patent
Wang et al.

(10) Patent No.: US 10,757,468 B2
(45) Date of Patent: *Aug. 25, 2020

(54) SYSTEMS AND METHODS FOR PERFORMING PLAYOUT OF MULTIPLE MEDIA RECORDINGS BASED ON A MATCHING SEGMENT AMONG THE RECORDINGS

(71) Applicant: Shazam Investments Ltd., London (GB)

(72) Inventors: Avery Wang, Palo Alto, CA (US); Maxwell Leslie Szabo, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/222,481

(22) Filed: Dec. 17, 2018

(65) Prior Publication Data

US 2019/0141388 A1    May 9, 2019

Related U.S. Application Data

(63) Continuation of application No. 15/729,104, filed on Oct. 10, 2017, now Pat. No. 10,158,907.

(51) Int. Cl.
*H04N 21/43* (2011.01)
*G11B 27/10* (2006.01)
(Continued)

(52) U.S. Cl.
CPC ......... *H04N 21/4307* (2013.01); *G06F 16/41* (2019.01); *G06F 16/71* (2019.01);
(Continued)

(58) Field of Classification Search
CPC ............... H04N 9/802; H04N 21/4307; H04N 21/4394; H04N 21/44008; H04N 21/8456;
(Continued)

(56) References Cited

U.S. PATENT DOCUMENTS 7,570,665 B2 *   8/2009   Ertel ...................... G06F 16/40
                                                    370/503
7,627,477 B2 *  12/2009   Wang ................. G06K 9/00536
                                                    341/110
(Continued)

FOREIGN PATENT DOCUMENTS

WO        20110140221 A1   11/2011

OTHER PUBLICATIONS

Shrestha et al., "Synchronization of Multiple Camera Videos Using Audio-Visual Features", IEEE Transactions on Multimedia, IEEE Service Center, Piscataway, NJ, US, vol. 12, No. 1, Jan. 1, 2010, pp. 79-92.

(Continued)

*Primary Examiner* — David E Harvey
(74) *Attorney, Agent, or Firm* — Blank Rome LLP

(57) ABSTRACT

An example method for performing playout of multiple media recordings includes receiving a plurality of media recordings, indexing the plurality of media recordings for storage into a database, dividing each of the plurality of media recordings into multiple segments, and for each segment of each media recording, (i) comparing the segment with the indexed plurality of media recordings stored in the database to determine one or more matches to the segment, and (ii) determining a relative time offset of the segment within each matched media recording. Following, the method includes performing playout of a representation of the plurality of media recordings based on the relative time offset of each matched segment.

20 Claims, 10 Drawing Sheets

(51) Int. Cl.
*H04N 9/802* (2006.01)
*H04N 21/439* (2011.01)
*H04N 21/44* (2011.01)
*H04N 21/845* (2011.01)
*G11B 27/00* (2006.01)
*G06F 16/71* (2019.01)
*G06F 16/783* (2019.01)
*G06F 16/41* (2019.01)

(52) U.S. Cl.
CPC ........ *G06F 16/7834* (2019.01); *G11B 27/007* (2013.01); *G11B 27/10* (2013.01); *H04N 9/802* (2013.01); *H04N 21/4394* (2013.01); *H04N 21/44008* (2013.01); *H04N 21/8456* (2013.01)

(58) Field of Classification Search
CPC ....... G11B 27/10; G11B 27/007; G06F 16/71; G06F 16/7834; G06F 16/41
See application file for complete search history.

(56) References Cited

U.S. PATENT DOCUMENTS

| | | | |
|---|---|---|---|
| 7,913,157 B1 | 3/2011 | Stoakley | |
| 8,205,148 B1* | 6/2012 | Sharpe | G11B 27/10 715/203 |
| 8,682,144 B1* | 3/2014 | Zhang | G06K 9/00765 386/201 |
| 8,924,345 B2* | 12/2014 | Bryan | G06F 16/683 707/610 |
| 9,111,579 B2 | 8/2015 | Meaney | |
| 9,437,247 B2 | 9/2016 | Pendergast | |
| 9,756,281 B2* | 9/2017 | Tcheng | G11B 27/031 |
| 9,792,955 B2 | 10/2017 | Fleischhauer | |
| 9,832,507 B2 | 11/2017 | Le Nerriec | |
| 10,158,907 B1* | 12/2018 | Wang | G06F 16/41 |
| 2012/0166139 A1* | 6/2012 | Schmidmer | H04N 17/004 702/180 |
| 2012/0275770 A1* | 11/2012 | Tsai | H04N 9/8205 386/282 |
| 2013/0121622 A1* | 5/2013 | Wilkes | B65D 75/008 383/10 |
| 2013/0121662 A1* | 5/2013 | Moorer | H04N 21/4223 386/240 |
| 2013/0121668 A1 | 5/2013 | Meaney | |
| 2013/0124999 A1* | 5/2013 | Agnoli | G11B 27/031 715/723 |
| 2013/0188923 A1* | 7/2013 | Hartley | H04N 9/87 386/241 |
| 2014/0079372 A1* | 3/2014 | Zhang | G06K 9/00765 386/241 |
| 2015/0003799 A1 | 1/2015 | Oostveen | |
| 2015/0279427 A1* | 10/2015 | Godfrey | G06F 16/686 386/241 |

OTHER PUBLICATIONS

Allen, John, "Synchronizing Video and audio tracks without time code," http://www.sheldonbrown.com/synchronize-video.html accessed on Oct. 10, 2017.

Bryan et al., "Clustering and Synchronizing Multi-Camera Video via Landmark Cross-Correlation," Acoustics, Speech and Signal Processing (ICASSP), 2012 IEEE International Conference.

How to play multiple videos side-by-side synchronized, http://superuser.com/questions/139549/how-to-play-multiple-videos-side-by-side-synchronized, accessed on Oct. 10, 2017.

Kammerl et al., "Temporal Synchronization of Multiple Audio Signals," Acoustics, Speech and Signal Processing (ICASSP), 2014 IEEE International Conference.

Shrestha et al., "Synchronization of Multi-Camera Video Recordings Based on Audio," Proceedings of the 15th International Conference on Multimedia 2007, Augsburg, Germany, Sep. 24-29, 2007.

* cited by examiner

STRETCHING ONE OR MORE OF THE PLURALITY OF MEDIA RECORDINGS TO MAP TO THE MASTER TIMELINE BASED ON ONE OR MORE OF THE PLURALITY OF MEDIA RECORDINGS BEING CAPTURED AT DIFFERENT RATES

FIG. 9 — 214

STRETCHING ONE OR MORE OF THE PLURALITY OF MEDIA RECORDINGS TO PLAY BACK IN SYNCHRONY WITH EACH OTHER TO MAP TO THE MASTER TIMELINE BASED ON ONE OR MORE OF THE PLURALITY OF MEDIA RECORDINGS BEING CAPTURED AT DIFFERENT RATES, WHEREIN STRETCHING INCLUDES REPEATING PLAYOUT OF FRAMES

FIG. 10 — 216

INTERPOLATING ONE OR MORE OF THE PLURALITY OF MEDIA RECORDINGS TO PLAY BACK IN SYNCHRONY WITH EACH OTHER TO MAP TO THE MASTER TIMELINE BASED ON ONE OR MORE OF THE PLURALITY OF MEDIA RECORDINGS BEING CAPTURED AT DIFFERENT RATES

FIG. 11 — 218

RESAMPLING THE AUDIO USING INTERPOLATION TO MAP TO THE MASTER TIMELINE BASED ON ONE OR MORE OF THE PLURALITY OF MEDIA RECORDINGS BEING CAPTURED AT DIFFERENT RATES

FIG. 12 — 220

FOR EACH MEDIA RECORDING, DETERMINING A TIMESCALE RATIO THAT IS ASSOCIATED WITH A SPEED AT WHICH THE MEDIA RECORDING WAS CAPTURED BASED ON A REFERENCE SPEED OF A REFERENCE MEDIA RECORDING

— 222

PERFORMING PLAYOUT OF THE REPRESENTATION OF THE PLURALITY OF MEDIA RECORDINGS BASED ON THE RELATIVE TIME OFFSET OF EACH MATCHED SEGMENT AND THE TIMESCALE RATIO OF EACH MEDIA RECORDING

FIG. 13 — 224

DETERMINING THE TIMESCALE RATIO FOR THE MEDIA RECORDING AT MULTIPLE POSITIONS IN THE MEDIA RECORDING

FIG. 14 — 226

MAINTAINING ALIGNMENT OF SYNCHRONIZATION OF PLAYOUT OF THE PLURALITY OF MEDIA RECORDINGS SIMULTANEOUSLY USING THE TIMESCALE RATIO OF EACH MEDIA RECORDING DETERMINED AT THE MULTIPLE POSITIONS IN THE MEDIA RECORDING

FIG. 15 — 228

RECEIVING LOCATION INFORMATION FOR AT LEAST SOME OF THE PLURALITY OF MEDIA RECORDINGS INDICATING A LOCATION OF WHERE THE PLURALITY OF MEDIA RECORDINGS WERE CAPTURED — 230

DETERMINING WHETHER TO INCLUDE A GIVEN MEDIA RECORDING WITHIN THE SYNCHRONIZED PLAYOUT BASED ON THE LOCATION INFORMATION MATCHING OR BEING WITHIN A THRESHOLD DISTANCE TO CONSENSUS LOCATION OF THE PLURALITY OF MEDIA RECORDINGS

FIG. 16 — 232

DETERMINING THAT ONE OR MORE OF THE PLURALITY OF MEDIA RECORDINGS INCLUDE A BREAK IN THE RECORDING DUE TO BEING PAUSED OR STOPPED — 234

PROCESSING THE ONE OR MORE OF THE PLURALITY OF MEDIA RECORDINGS THAT INCLUDE THE BREAK AS SEPARATE MEDIA RECORDINGS TO BE SYNCHRONIZED IN THE PLAYOUT OF THE PLURALITY OF MEDIA RECORDINGS

FIG. 17 — 236

FOR MEDIA RECORDINGS OF THE PLURALITY OF MEDIA RECORDINGS THAT HAVE AT LEAST ONE MATCHED SEGMENT TO THE INDEXED PLURALITY OF MEDIA RECORDINGS, SYNCHRONIZING PLAYOUT OF THE PLURALITY OF MEDIA RECORDINGS SIMULTANEOUSLY

FIG. 18 — 238

SYNCHRONIZING PLAYOUT OF THE PLURALITY OF MEDIA RECORDINGS SIMULTANEOUSLY BASED ON MATCHING AUDIO SEGMENTS WITHIN EACH MEDIA RECORDING

FIG. 19 — 240

SYSTEMS AND METHODS FOR PERFORMING PLAYOUT OF MULTIPLE MEDIA RECORDINGS BASED ON A MATCHING SEGMENT AMONG THE RECORDINGS

FIELD

The present disclosure relates to media information retrieval and synchronization of media. For example, the present disclosure relates to synchronization of multiple videos captured by multiple video cameras using common audio found within the videos.

BACKGROUND

Video recordings and surveillance are becoming increasingly ubiquitous as a cost of video recording equipment and infrastructure decreases, as well as size and weight shrinking to easily wearable sizes. Recording cameras may be economically located on fixed locations (e.g., walls, ceilings, street corners, etc.), or mobile objects (e.g., vehicles, bikes, drones), or wearable objects as well (e.g., helmets, glasses, augmented reality headsets, or body-worn cameras). Multiple cameras in an environment may be available as stationary installations, as well as transient portable units. Furthermore, videos may be recorded by bystanders with portable video recorders, such as for example, on a smartphone. Such videos may be posted publicly on a video storage or video sharing website and may beneficially provide additional points of view.

In some applications, it is desirable to synchronize multiple video recordings and play back the multiple videos simultaneously on a single timeline, for example, to examine an event of interest such as in a law enforcement action. The synchronization task, however, is difficult, and is performed manually. To illustrate some difficulties, in an example scenario involving multiple police officers wearing body cameras having video and audio recording capabilities, it may be that not all officers are always in the same location at the same time and lack common audio. It may also be that the cameras have such different perspectives that the cameras have no common elements for a human operator to visually recognize as a common cue to perform the synchronization. Furthermore, audio tracks from different perspectives may also be so different that a human operator cannot recognize common elements, for example, if one officer is standing some distance away from another and background noise around each officer is different due to crowd or traffic noise. There is also typically far more background noise (as compared to a studio environment), which simply complicates the alignment. In such cases, manual alignment may be practically impossible. Nevertheless, evidence videos are currently synchronized manually, with each hour of video requiring about three hours of operator time to align. Unfortunately, manual synchronization is not always accurate and the results of such alignment have been disregarded or unusable for some circumstances.

Some existing ways to perform alignment of videos includes human operators using embedded time codes in the videos. A problem with this approach is that the time codes are not necessarily accurate due to the cameras not being synchronized to a time source. Independent camera sources are not tied to the same time source, in contrast to studio cameras that are each connected to the same time source and receive a clock signal to maintain synchronization.

Another problem is that different cameras may have slightly different speed ratios (i.e., speeds or frame rates at which video is captured) depending on a quality of the camera. This is due to independently generated time bases that deviate from a nominal clock rate by a small amount, which may be on an order of less than 1%. But, even this small amount provides a synchronization challenge in that if the videos are played from a single point of synchronization, the videos could diverge by more than 1 second after 2 minutes. Human auditory perception can detect differences less than 1 millisecond for binaural direction discernment. Thus, an example video length of 10 minutes, or 600,000 milliseconds, may result in synchronization divergence being detectable with as little as 1.7 ppm (parts per million) speed ratio error. In practice, differences of over 100 ppm are common, and thus, speed ratio differences among different cameras present a large challenge to synchronization of videos.

SUMMARY

In one example, a method is described including receiving a plurality of media recordings, indexing the plurality of media recordings for storage into a database, dividing each of the plurality of media recordings into multiple segments, and for each segment of each media recording, (i) comparing the segment with the indexed plurality of media recordings stored in the database to determine one or more matches to the segment, and (ii) determining a relative time offset of the segment within each matched media recording. Following, the method includes performing playout of a representation of the plurality of media recordings based on the relative time offset of each matched segment.

In another example, a method is described including receiving a plurality of media recordings, indexing the plurality of media recordings for storage into a database, dividing each of the plurality of media recordings into multiple segments, and for each segment of each media recording, (i) comparing the segment with the indexed plurality of media recordings stored in the database to determine one or more matches to the segment, and (ii) determining a relative time offset of the segment within each matched media recording. The method also includes for each media recording, determining a timescale ratio that is associated with a speed at which the media recording was captured based on a reference speed of a reference media recording, and performing playout of a representation of the plurality of media recordings based on the relative time offset of each matched segment and the timescale ratio of each media recording.

In another example, a method is described including receiving a plurality of media recordings, indexing the plurality of media recordings for storage into a database, dividing each of the plurality of media recordings into multiple segments, and for each segment of each media recording, (i) comparing the segment with the indexed plurality of media recordings stored in the database to determine one or more matches to the segment, and (ii) determining a relative time offset of the segment within each matched media recording. The method also includes for each media recording, determining a timescale ratio that is associated with a speed at which the media recording was captured based on a reference speed of a reference media recording, and synchronizing playout of the plurality of media recordings simultaneously based on the relative time offset of each matched segment and the timescale ratio of each media recording.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 9 shows a flowchart of an example method that may be used with the method 200 of FIG. 8, according to an example implementation.

FIG. 10 shows a flowchart of an example method that may be used with the method 200 of FIG. 8, according to an example implementation.

FIG. 11 shows a flowchart of an example method that may be used with the method 200 of FIG. 8, according to an example implementation.

FIG. 12 shows a flowchart of an example method that may be used with the method 200 of FIG. 8, according to an example implementation.

FIG. 13 shows a flowchart of an example method that may be used with the method 200 of FIG. 8, according to an example implementation.

FIG. 14 shows a flowchart of an example method that may be used with the method 200 of FIG. 8, according to an example implementation.

FIG. 15 shows a flowchart of an example method that may be used with the method 200 of FIG. 8, according to an example implementation.

FIG. 16 shows a flowchart of an example method that may be used with the method 200 of FIG. 8, according to an example implementation.

FIG. 17 shows a flowchart of an example method that may be used with the method 200 of FIG. 8, according to an example implementation.

FIG. 18 shows a flowchart of an example method that may be used with the method 200 of FIG. 8, according to an example implementation.

FIG. 19 shows a flowchart of an example method that may be used with the method 200 of FIG. 8, according to an example implementation.

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Example methods and systems described herein may be used to synchronize playout of multiple media recordings (including video and/or audio) at the same time to enable a user to view the multiple videos simultaneously, or to determine relative time offsets of the multiple videos that is used for aligning the videos for generation of a single composite video. The videos that can be synchronized are captured by video recorders that are in a vicinity of each other, and captured during some overlapping time period such that each media recording adds a different view or additional information to the overall playout. A benefit of having multiple simultaneous points of view is to be able to gain a fuller understanding of events of interest that may be highly dynamic, obstructed, or otherwise outside a field of view of any camera. This may allow a more objective interpretation of forensic video evidence, for example. The synchronized and simultaneous playout is further beneficial for a user to enable viewing all videos together to gain an appreciation of the event, rather than viewing each video individually.

Example uses include gathering may video recordings, that may be unorganized and captured by many different users, and determining which of the videos are related due to capturing the same or similar event from a same or similar location, and at a same or overlapping time period.

Figure 1:
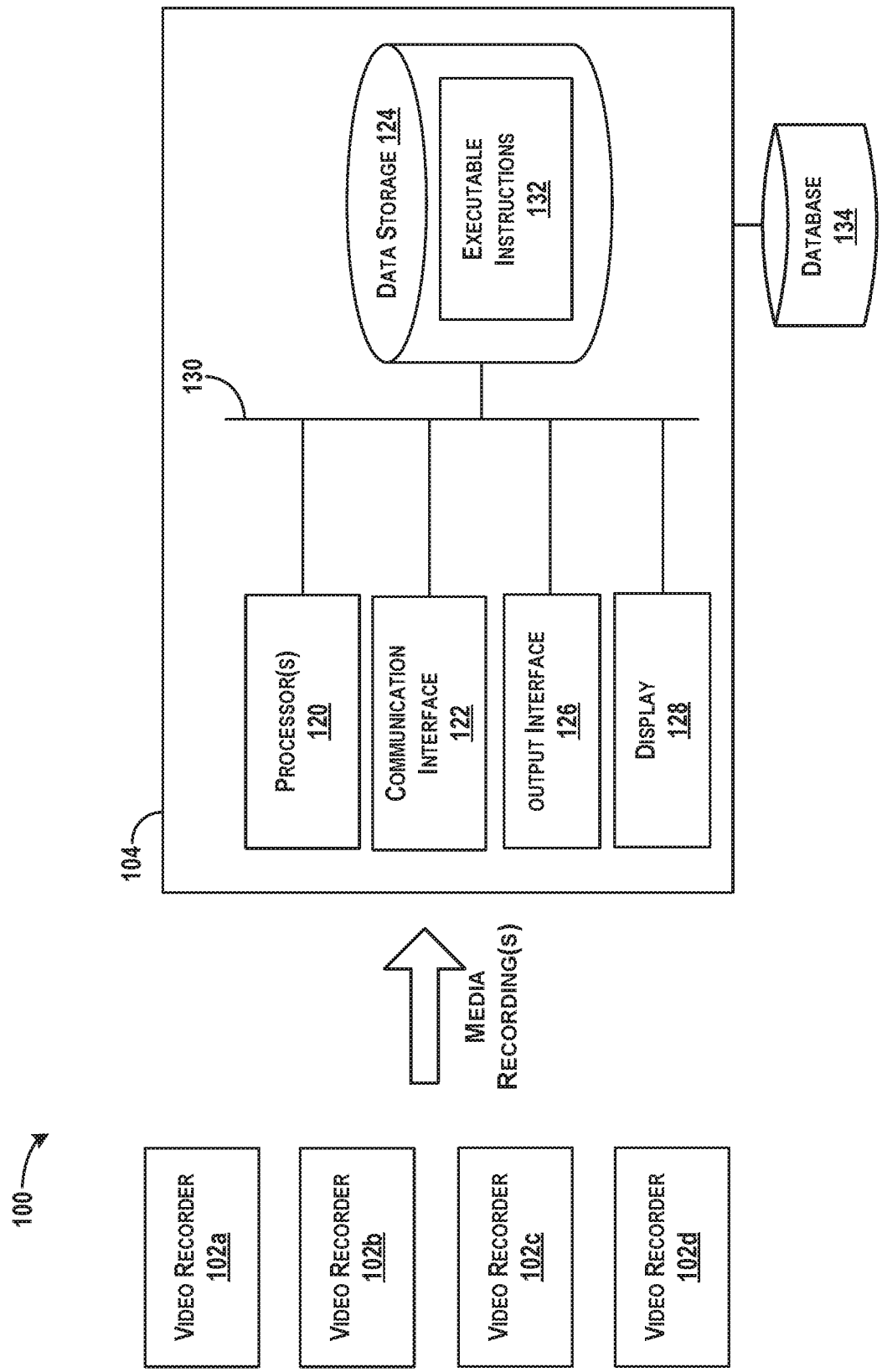
FIG. 1 is a block diagram of a system, according to an example implementation.

Referring now to FIG. 1, a block diagram of a system 100 is illustrated, according to an example implementation. The system 100 includes multiple video recorders 102*a-d* that output media samples to a computing device 104.

The video recorders 102*a-d* may be or include any number of devices capable of recording video and/or audio. Example devices include a small-form factor portable (or mobile) electronic device such as a cell phone, a wireless cell phone, a personal data assistant (PDA), a personal media player device, a wireless web-watch device, a personal headset device, an application specific device, or a hybrid device that include any of the above functions and includes a camera or recording capability. The video recorders 102*a-d* can thus be a video camera, a digital camera, a smartphone, a tablet device, or any computing device with a camera and can be a component of a larger device or system as well.

The video recorders 102a-d record video, audio, and/or video and audio to generate media recordings. Thus, an example media recording may include full video and associated audio, or only video, or only audio. A media recording can be any combination of audio and video, and thus, may be generated with or without video tracks, or with or without audio tracks. Thus, the video recorders 102a-d can include both cameras for recording video and microphones for recording audio. The video recorders 102a-d can include other components as well for communication (e.g., radio transceiver or network interface, etc.), as well as data storage for storing recorded media recordings. Each video recorder 102a-d may be independent and not operationally coupled to the computing device 104, other than to communicate the media recordings. In this manner, the video recorders 102a-d do not have operations controlled by the computing device 104. In the example shown in FIG. 1, the video recorders 102a-d are separate entities from the computing device 104.

The computing device 104 has a processor(s) 120, and also a communication interface 122, data storage 124, an output interface 126, and a display 128 each connected to a communication bus 130. The computing device 104 may also include hardware to enable communication within the computing device 104 and between the computing device 104 and other devices, such as the video recorders 102a-d. The hardware may include transmitters, receivers, and antennas, for example.

The communication interface 122 may be a wireless interface and/or one or more wireline interfaces that allow for both short-range communication and long-range communication to one or more networks or to one or more remote devices. Such wireless interfaces may provide for communication under one or more wireless communication protocols, such as Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 122 may be configured to receive input data from one or more devices, and may also be configured to send output data to other devices. As an example, the communication interface 122 may receive media samples from the video recorders 102a-d over a wireless communication or a wired communication.

The data storage 124 may include or take the form of one or more computer-readable storage media that can be read or accessed by the processor(s) 120. The computer-readable storage media can include volatile and/or non-volatile storage components, such as optical, magnetic, organic or other memory or disc storage, which can be integrated in whole or in part with the processor(s) 120. The data storage 124 is considered non-transitory computer readable media. In some examples, the data storage 124 can be implemented using a single physical device (e.g., one optical, magnetic, organic or other memory or disc storage unit), while in other examples, the data storage 124 can be implemented using two or more physical devices.

The data storage 124 thus is a non-transitory computer readable storage medium, and executable instructions 132 are stored thereon. The instructions 132 include computer executable code. When the instructions 132 are executed by the processor(s) 120, the processor(s) 120 are caused to perform functions. Such functions include receiving media recordings from the video recorders 102a-d, and synchronizing playout of the media recordings simultaneously or playout of a representation of the media recordings, as described more fully below.

The processor(s) 120 may be a general-purpose processor or a special purpose processor (e.g., digital signal processors, application specific integrated circuits, etc.). The processor(s) 120 may receive inputs from the communication interface 122, and process the inputs according to the executable instructions 132 to generate outputs that are stored in the data storage 124 and output to the display 128. The processor(s) 120 can be configured to execute the executable instructions 132 (e.g., computer-readable program instructions) that are stored in the data storage 124 and are executable to provide the functionality of the system 100 described herein. Although one processor 120 is shown, multiple processors may be included in the computing device 104.

The output interface 126 outputs information to the display 128 or to other components as well. Thus, the output interface 126 may be similar to the communication interface 122 and can be a wireless interface (e.g., transmitter) or a wired interface as well.

In an example operation, the video recorders 102a-d may be used to capture video by multiple people. In one scenario, the video recorders 102a-d may be wearable cameras, or body cameras, worn by law enforcement officers. Each of the video recorders 102a-d may capture video in a vicinity of an officer, and may output the media recordings to the computing device 104, either in real-time or in a batch process. If the officers are pairwise in each other's vicinities in a presence of anchor events, then the media recordings may be pairwise aligned and synchronized for simultaneous playout, for example.

In other scenarios, the video recorders 102a-d may include stationary devices and mobile devices, each of which is used to record video of an area or event. The media recordings can then be processed to be arranged for playout in a synchronized manner based on common anchor events identified in the media recordings.

Within examples, to perform alignment of the media recordings for generation of a composite file and/or synchronization of playout of the media recordings, the computing device 104 identifies common anchor events in the media recordings to align the media recordings using the anchor events. An anchor event can include any audio, video, and/or audio and video present within one media recording that can also be seen or heard within another video recording, and thus, used as a way to synchronize playout of the media recordings. Because each media recording is recorded by a different video recorder, each media recording will have a slightly or largely different video, but can have very similar audio if recorded in similar vicinities of each other. Thus, in examples, audio can be used to synchronize playout of the media recordings.

In an example, the media recordings are received by the computing device 104, and then the computing device 104 (or the processor(s) 120) indexes the media recordings for storage into a database 134. In FIG. 1, the database 134 is shown separate from the computing device 104. In other examples, the database 134 may be a component of the computing device 104.

Figure 2:
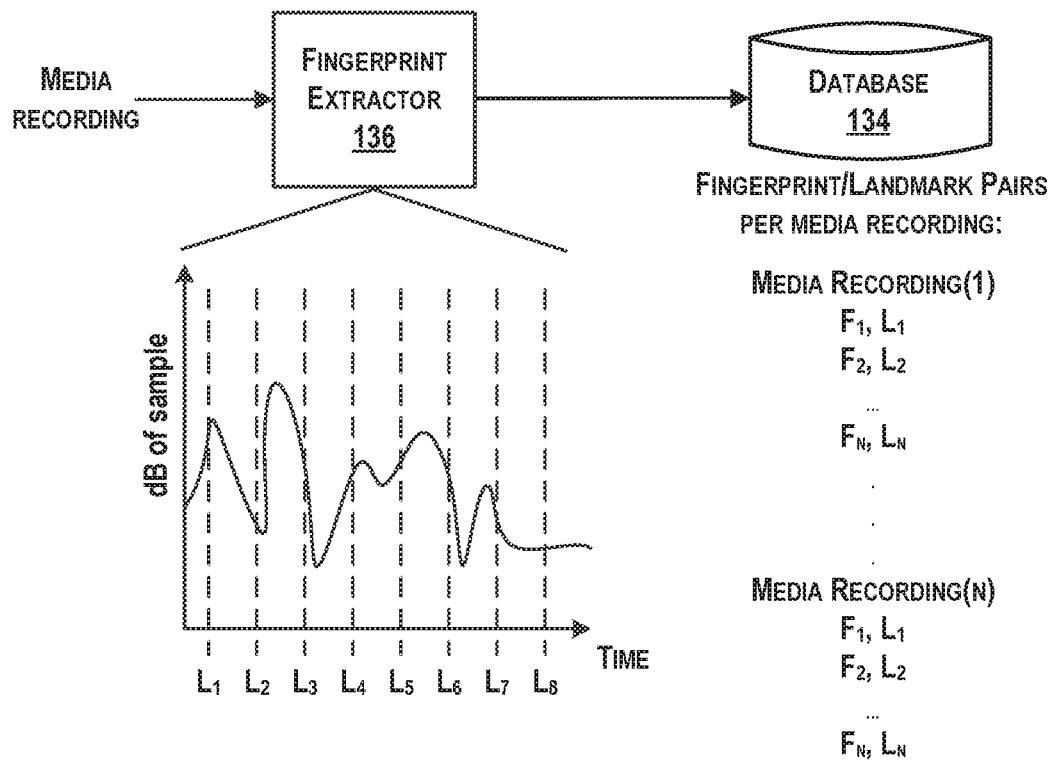
FIG. 2 illustrates an example diagram for indexing the media recordings for storage into database, according to an example implementation.

FIG. 2 illustrates an example diagram for indexing the media recordings for storage into database 134, according to an example implementation. Functions shown and described with respect to FIG. 2 may be implemented by the computing device 104, by a server, or in some examples some functions may be performed by the video recorders 102a-d. Thus, components shown in FIG. 2 may be included within the video recorders 102a-d and/or within the computing device 104. In addition, components shown in FIG. 2 may be implemented with a processor executing instructions to perform functions described.

The media recordings are input to a fingerprint extractor 136 that computes characteristics or fingerprints of the media recordings. An example plot of dB (magnitude) of a sample vs. time is shown, and the plot illustrates a number of identified landmark positions ($L_1$ to $L_8$) in the sample.

Particular locations within the sample at which fingerprints are computed may depend on reproducible points in the sample. Such reproducibly computable locations are referred to as "landmarks." One landmarking technique, known as Power Norm, is to calculate an instantaneous power at many time points in the recording and to select local maxima. One way of doing this is to calculate an envelope by rectifying and filtering a waveform directly. Another way is to calculate a Hilbert transform (quadrature) of a signal and use a sum of magnitudes squared of the Hilbert transform and the original signal. Other methods for calculating landmarks may also be used.

Once the landmarks have been determined, a fingerprint is computed at or near each landmark time point in the recording. The fingerprint is generally a value or set of values that summarizes a feature or a set of features in the recording at or near the landmark time point. In one example, each fingerprint is a single numerical value that is a hashed function of multiple features. Other examples of fingerprints include spectral slice fingerprints, multi-slice fingerprints, LPC coefficients, cepstral coefficients, and frequency components of spectrogram peaks. In one example, to generate spectral slice fingerprints, a frequency analysis is performed in the neighborhood of each landmark timepoint to extract the top several spectral peaks. A fingerprint value may then be the single frequency value of a strongest spectral peak. For more information on calculating characteristics or fingerprints of audio samples, the reader is referred to U.S. Pat. No. 6,990,453, the entire disclosure of which is herein incorporated by reference as if fully set forth in this description.

The fingerprint extractor 136 may generate a set of fingerprints each with a corresponding landmark and provide the fingerprint/landmark pairs for each media recording for storage in the database 134. For example, fingerprint and landmark pairs ($F_1/L_1, F_2/L_2, \ldots, F_n/L_n$) can be determined for each media recording. The fingerprints and landmark pairs may be represented in the database 134 as key-value pairs where the key is the fingerprint and the value is a corresponding landmark. A value may also have an associated media recording identifier within the database 134, for example, that maps to the video recorder 102a-d of the referenced fingerprints/landmarks. Media recordings can be indexed with the identifier from 0 to N−1, where N is a number of media recordings.

The database 134 may also include or store information for each indexed media recording. For example, metadata may be stored with each indexed media recording that indicates information about the media recording, such a length of the media recording, a date and time of the media recording, a location (e.g., geographic coordinates, or descriptive location like a coffee shop) at which the media recording was captured, or any other identifying or related information to the media recording.

After indexing the media recordings for storage into the database 134, the computing device 104 then uses the indexed media recordings to identify which of the received media recordings has any matching portions to any of the indexed media recordings. To do so, the computing device divides each of the received media recordings into multiple segments, and for each segment of each media recording, the computing device compares the segment with the indexed plurality of media recordings stored in the database 134 to determine one or more matches to the segment.

Figure 3:
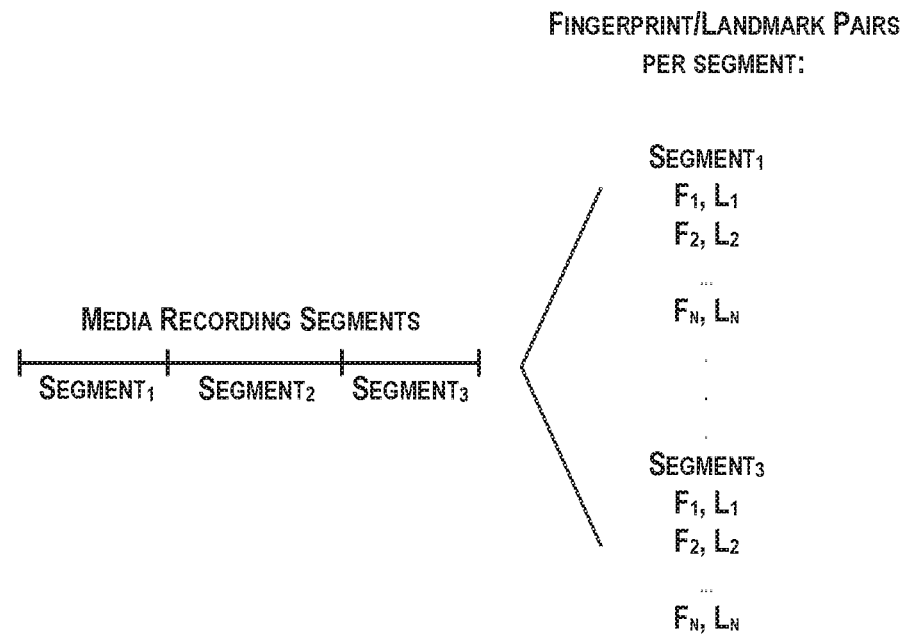
FIG. 3 illustrates an example diagram for segmenting the media recordings for comparison to the indexed media recordings in the database, according to an example implementation.

FIG. 3 illustrates an example diagram for segmenting the media recordings for comparison to the indexed media recordings in the database 134, according to an example implementation. In FIG. 3, a media recording is shown along a timeline, and the media recording is segmented into three segments (e.g., $segment_1$, $segment_2$, and $segment_3$). However, the media recording may be segmented into more or fewer segments depending on a length of the segments or a length of the media recording. An example segment may be about 5 seconds in length. Other lengths may be used too, such as 2 seconds, or 10 seconds, for example.

The computing device 104 may then process each segment to generate associated fingerprint and landmark pairs, in the same way as described above with reference to FIG. 2. Following, the computing device can compare the fingerprint and landmark pairs of each segment to the indexed fingerprint and landmark pairs of the media recordings in the database 134 to identify matches. The comparison can be an all versus all comparison, where all segments are compared against all indexed media recordings in the database 134. This includes a pairwise matching process between the fingerprint/landmark pairs of the segments with the fingerprint/landmark pairs of the indexed media recordings. There will be matches of course of the segments of a media recording to the indexed version of the media recording, and one goal is to obtain those matches as well as any other matches to other unrelated media recordings, for example.

Thus, each segment of each file is matched against all indexed files to identify pairwise matches of segment fingerprint/landmark pairs to indexed recording fingerprint/landmark pairs.

To identify matches, fingerprints of a segment can be matched to fingerprints of the database 134 by generating correspondences between equivalent fingerprints (or substantially equivalent fingerprints) to locate an indexed media recording that has a number of linearly related correspondences, or whose relative locations of characteristic fingerprints most closely match the relative locations of the same fingerprints of the segment.

Figure 4:
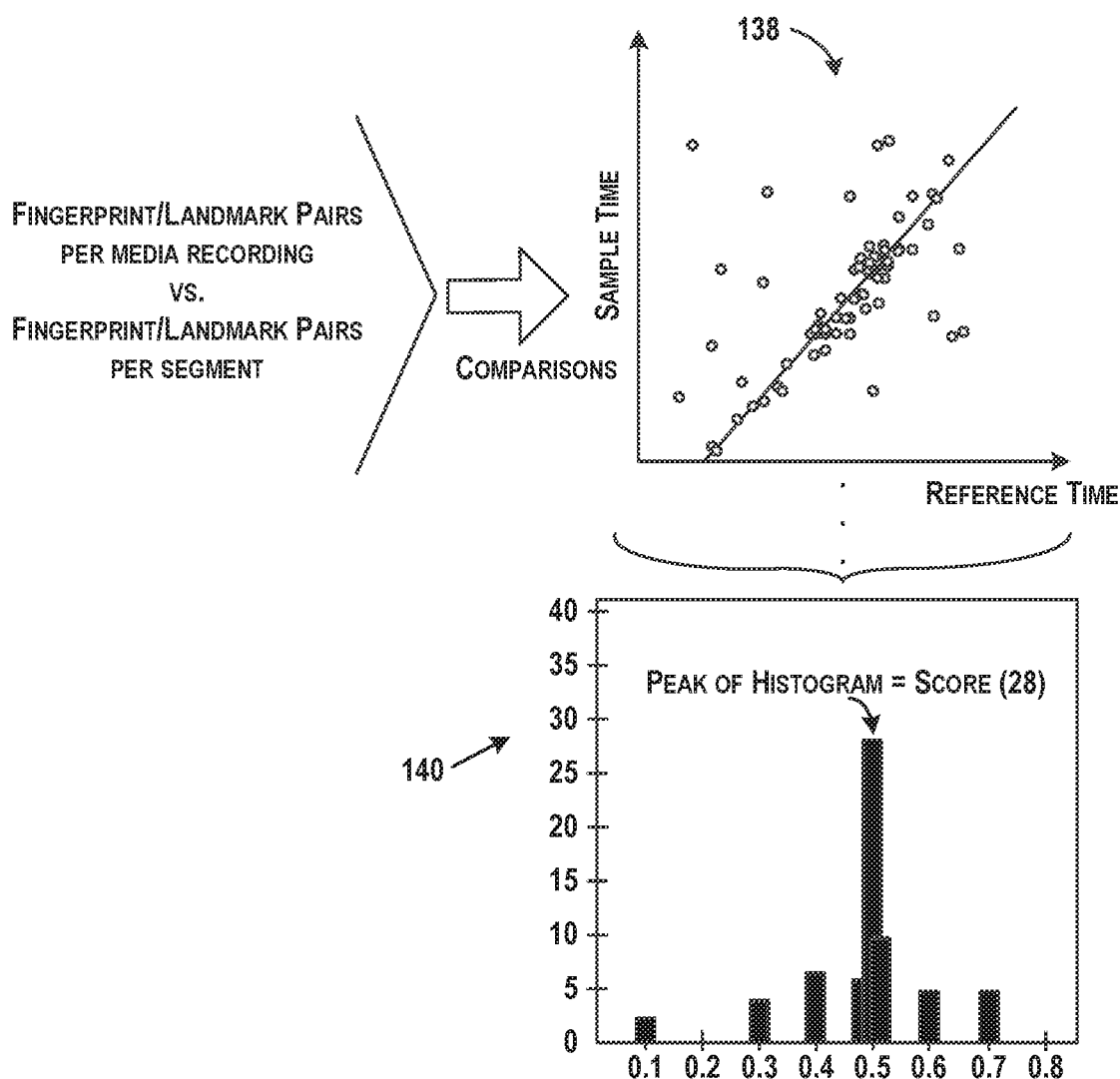
FIG. 4 is a scatter plot of landmarks of the segment and an indexed media recording at which fingerprints match (or substantially match), according to an example implementation.

Referring to FIG. 4, a scatter plot 138 of landmarks of the segment and an indexed media recording at which fingerprints match (or substantially match) is illustrated, according to an example implementation. After generating a scatter plot, linear correspondences between the landmark pairs can be identified, and sets can be scored according to the number of pairs that are linearly related. A linear correspondence may occur when a statistically significant number of corresponding sample locations and reference file locations can be described with substantially the same linear equation, within an allowed tolerance, for example.

In one example, a histogram 140 of time offset values can be generated. The offset values may be differences in landmark time positions between the segment and the indexed media recording where a fingerprint matches. FIG. 4 illustrates an example histogram 140 of offset values. The time offset value having a peak of the histogram (e.g., score=28 in FIG. 4) is a winning time offset, indicating the time offset to use for the matched segment. Each segment can be processed in this manner to generate a time offset to be used for further comparison purposes, described below.

Figure 5:
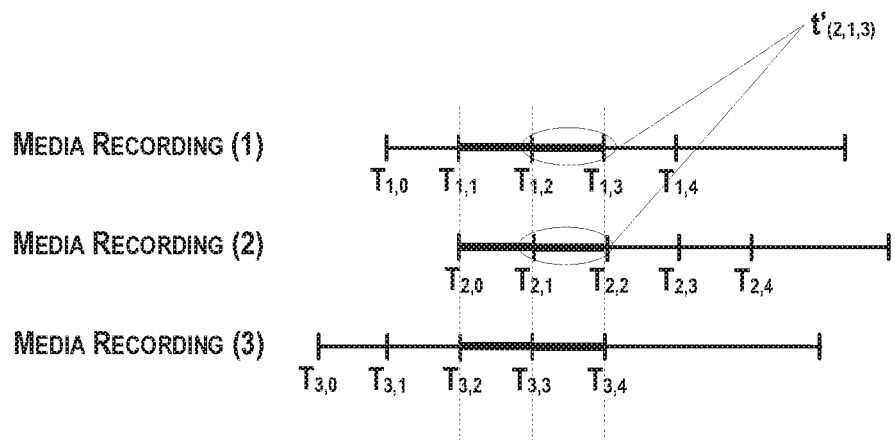
FIG. 5 is a conceptual illustration of another example of matching media recordings, according to an example implementation.

FIG. 5 is a conceptual illustration of another example of matching media recordings, according to an example implementation. In FIG. 5, three media recordings are shown, each of different lengths, and each media recording has been divided up into segments labeled as $t_{j,k}$ where "j" indicates a reference to the media recording and "k" indicates a segment number. The corresponding time of the k-th segment of the j-th file would be $t_{(j,k)}$. Also, $t_{(j,k)}$ could be k*L, where L is the length of the segments (assuming the segments are equally spaced, for example). Thus, $T_{1,2}$ indicates the beginning time of the second segment in the first media recording. After fingerprint matching, it may be determined that the second segment of the first media recording, the first segment of the second media recording, and the third segment of the third media recording are matching. Additional segments may be matching as well as shown.

To determine associated time offsets, the example histogramming method above can be used. Looking at the example in FIG. 5, this may include determining a time difference $t'_{(i,j,k)}$, where it is the time offset of the k-th segment from the j-th file matched against the i-th file, in file i's time coordinates. This is because the k-th segment of the j-th file is matched against all the other files and is independent of what file the segment is matching against. In FIG. 5, a time difference may be: $T_{1,2}-T_{2,1}=T_0$ for $t'_{(2,1,3)}$. Similarly, a time difference between another matching segment can be determined $T_{1,3}-T_{2,2}=T_0$ for $t'_{(2,1,4)}$. When the time differences are equal (or substantially equal) between matching segments of two recordings (e.g., pairwise matching results in equal or substantially equal time differences), then the determined time difference $T_0$ is correct and will be used to align the files.

Note that $t_{(j,k)}$ could be furthermore independent of j. This is because the j-th file is segmented using the same time offsets, independent of which file it is. In one example, the j-th file could be split into segments starting at 0, 5, 10, 15 . . . seconds, assuming L=5 seconds, and those times are relative to the j-th file. Then, if there is a match of the k-th segment of the j-th file against the i-th file, the time offset of the match would be $t'_{(i,j,k)}$, relative to the i-th file's nominal timeline.

Various other media sample identification techniques are known in the art for performing computational comparisons of media samples and features of media samples using a database of media content objects. The following U.S. Patents and publications describe possible examples for media sample comparison techniques, and each is entirely incorporated herein by reference, as if fully set forth in this description: Kenyon et al, U.S. Pat. No. 4,843,562; Kenyon, U.S. Pat. No. 4,450,531; Haitsma et al, U.S. Patent Application Publication No. 2008/0263360; Wang and Culbert, U.S. Pat. No. 7,627,477; Wang, Avery, U.S. Patent Application Publication No. 2007/0143777; Wang and Smith, U.S. Pat. No. 6,990,453; Blum, et al, U.S. Pat. No. 5,918,223; Master, et al, U.S. Patent Application Publication No. 2010/0145708.

Other forms of media sample comparison may also be performed depending on a type of the media sample. For example, a video identification algorithm may be used to identify a position within a video stream (e.g., a movie). An example video identification algorithm is described in Oostveen, J., et al., "Feature Extraction and a Database Strategy for Video Fingerprinting", Lecture Notes in Computer Science, 2314, (Mar. 11, 2002), 117-128, the entire contents of which are herein incorporated by reference. For example, a position of a video sample into a video recording can be derived by determining which video frame was identified. To identify the video frame, frames of the media sample can be divided into a grid of rows and columns, and for each block of the grid, a mean of the luminance values of pixels is computed. A spatial filter can be applied to the computed mean luminance values to derive fingerprint bits for each block of the grid. The fingerprint bits can be used to uniquely identify the frame, and can be compared or matched to fingerprint bits of a database that includes known media. The extracted fingerprint bits from a frame may be referred to as sub-fingerprints, and a fingerprint block is a fixed number of sub-fingerprints from consecutive frames. Using the sub-fingerprints and fingerprint blocks, identification of video samples can be performed. Based on which frame the media sample included, a position into the video (e.g., time offset) can be determined.

Furthermore, other forms of content and/or position identification and matching may also be performed, such as using watermarking methods. A watermarking method can be used to determine a time offset in instances in which the media recordings and associated segments may have embedded watermarks at intervals, and each watermark specifies a time or position of the watermark either directly, or indirectly via a database lookup, for example. If the media recording includes embedded watermarks that indicate, either directly or indirectly, a time or position offset value, the computing device 104 may determine the time offset of a segment into the indexed media recordings.

After performing comparisons, using any of the example techniques described above, the time differences or time offset values are determined, which includes determining a relative time offset of the segment within each matched media recording. The offset values are differences in landmark time positions between the segment and the indexed media recording where a fingerprint matches. An offset value is a time offset of the segment within the indexed media recording. The offset value may be designed an estimated time position ($T_S$) indicating a time offset of the segment into the media recording.

A relative time offset (RTO) of a segment sample from a beginning of an indexed media recording can then be determined. To determine a relative time offset of the segment, fingerprints of the sample can be compared with fingerprints of the original files to which the fingerprints match. Each fingerprint occurs at a given time, so after matching fingerprints to identify the sample, a difference in time between a first fingerprint (of the matching fingerprint in the segment) and a first fingerprint of the indexed media recording will be a time offset of the segment, e.g., amount of time into the indexed media recording, as described above. Then, a relative time offset (e.g., 67 seconds into the indexed media recording) at which the segment matches can be determined. Other information may be used as well to determine the RTO. For example, a location of a histogram peak may be considered the time offset from a beginning of the indexed media recording to the beginning of the segment.

Following, the computing device 104 can perform playout of the media recordings based on the relative time offset of each matched segment. For example, each of the media recordings can be considered associated with a master timeline, and the computing device 104 can map the relative time offset of segments within a given media recording to the master timeline. Following, the computing device 104 can initiate playout of all media recordings simultaneously according to the mapping on the master timeline. The playout may occur on a single graphical interface or multiple interfaces, for example.

In other examples, the computing device 104 can generate a composite file using all of the media recordings aligned based on the relative time offset of each matched segment. The composite file may be generated using a video encoding program (e.g., such as FFMPEG and its overlay function) to composite multiple videos together into a single video. For instance, the overlay function may include inputs of the multiple videos and output a single composite file. A first input may be a "main" video on which other videos are overlaid. Coordinates for overlaying of the videos can include the relative time offsets to properly align the overlay. Frames may be taken from each input video in a timestamp order, and thus, the alignment of the videos enables them to begin in the same zero timestamp. The FFMPEG also enables playout of the multiple videos as a composite file by specifying a time to play a portion or portions of each video file (e.g., ffplay —ss 13.45 1.mp4 indicates to play video file 1.mp4 starting at 13.45 seconds into the file). The FFMPEG program can be used to pad videos to matching sizes, or overlay audio of one file onto video of another file, or to generate a composite file that includes side-by-side videos. Any of the composite file generation tools of FFMPEG may be used by the computing device 104 to generate the composite file for playout, for example. Other video encoding programs may also be used to generate a composite video file or to overlay portion(s) of a video onto another, for example.

Thus, the computing device 104 may perform playout of a representation of the plurality of media recordings, and the representation may include a synchronized playout of all or some of the videos individually or a playout of a single composite video file (and the composite video file may take many forms, as described herein).

As mentioned, within examples, the media recordings include video and audio, and synchronized playout of the media recordings or generation of the composite video can be based on matching audio segments within each media recording. The computing device 104 may only synchronize playout of media recordings that have at least one matched segment to the indexed plurality of media recordings, for example. In this way, if a media recording has no matches, then the media recording is likely not relevant for synchronized playout. The playout of the media recordings can occur simultaneously.

The media recordings may also be associated with location information indicating a location of where the media recordings were captured, and the computing device 104 can determine whether to include a given media recording within the synchronized playout based on the location information matching or being within a threshold distance to consensus location of the all of media recordings. The location information may be geographic location information, such as geographic coordinates, and a threshold distance to consider may be within about 20-50 feet of the consensus location. The consensus location may be established by selecting one media recording and determining the geographic location where it was captured. Other types of location information can be used as well to estimate that media recordings were captured in a vicinity of each other, such as GPS data, Bluetooth or Wi-Fi nodes (beacons), etc. If such location information indicates that the media recordings were captured near each other, then a posterior probability weighting implies that any detected event coincidences should be higher than if the media recordings are known not to have been captured close together. Such information may optionally be considered for determination of whether to include a media recording in the playout.

In one example, the computing device 104 can then playout the media recordings at a position mapped along the master timeline to synchronize the playouts based on the common audio within the media recordings. The master timeline may have a start time as an earliest time of any media recording, and an end time as a latest time of any media recording, for example.

In other examples, the computing device may further determine, for each video recording, a timescale ratio that is associated with a speed at which the video recording was captured based on a reference speed of a reference video recording, and then perform playout of the video recordings based on the relative time offset of each matched segment and the timescale ratio of each video recording. The timescale ratio is a speed adjustment ratio R that indicates how much a video recording needs to be sped up or slowed down to map to the master timeline.

Figure 6:
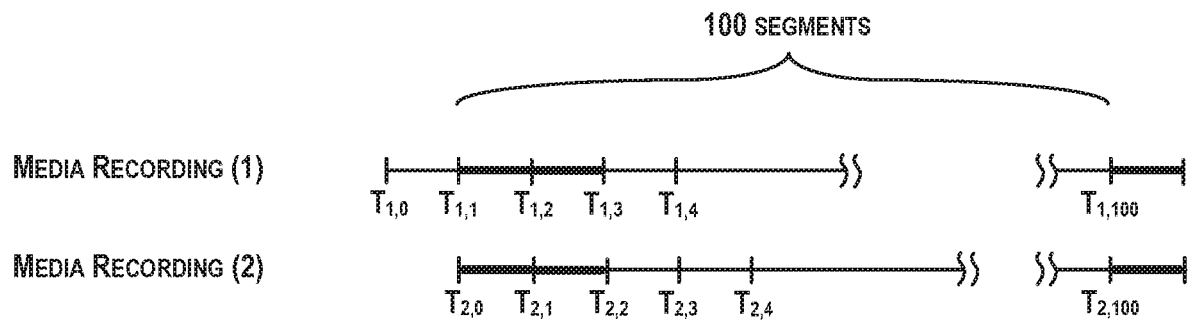
FIG. 6 is a conceptual illustration of an example of determining the timescale ratio, according to an example implementation.

FIG. 6 is a conceptual illustration of an example of determining the timescale ratio, according to an example implementation. In FIG. 6, two media recordings are shown divided into segments and matched against each other. Matches are found throughout the segments. As discussed above, the time differences between matches is determined as well to determine $T_0$. When doing so, time differences between matching segments are found. However, the time differences between first matching segments, and the $100^{th}$ matching segments will only be identical if the videos were captured using the same frame rate. In practice, however, video recorders each will likely have slightly different capture rates resulting in the time difference determinations having negligible error. The error difference grows over time. The timescale ratio between the two video recorders that recorded the media recordings (1) and (2) can thus be determined by determining the relative speed ratio between the i-th file versus the j-th file, labeled as $R_{(i,j)}$, and the relative time offset would be $T_{(i,j)}$ within file i, in file i's time coordinates so that $$t'_{(i,j,k)} = T_{(i,j)} + R_{(i,j)} \times t_{(j,k)} = T_{(i,j)} + R_{(i,j)} \times k \times L$$

Notice that as k increases (i.e., the segment increases), both $t_{(j,k)}$ and $t'_{(i,j,k)}$ increase by L, and $t'_{(i,j,k)}$ and $R_{(i,j)} \times L$, respectively.

Another aspect is that the parameters $T_{(i,j)}$ and $R_{(i,j)}$ may be estimated per segment. In this case, the k-th segment would have estimated parameters $T_{(i,j,k)}$ and $R_{(i,j,k)}$. These values could, for example, be averaged together to find the overall $T_{(i,j)}$ and $R_{(i,j)}$. In some examples, for more accuracy, a linear regressor can be used to find $T_{(i,j)}$ and $R_{(i,j)}$ using the data points $t'_{(i,j,k)}$ and $t_{(j,k)}$. For example, one may calculate a least squares regressor as follows:

$$X_{(i,j)} = \sum_{k \in K} t'_{(i,j,k)}$$

$$Y_{(j)} = \sum_{k \in K} t_{(j,k)}$$

$$YY_{(j)} = \sum_{k \in K} t_{(j,k)}^2$$

$$XY_{(i,j)} = \sum_{k \in K} t_{(j,k)} t'_{(i,j,k)}$$

-continued $$D_{(j)} = |K| * YY_{(j)} - Y_{(j)}^2$$

and finally $$T_{(i,j)} = \frac{X_{(i,j)} * YY_{(j)} - XY_{(i,j)} * Y_{(j)}}{D_{(j)}}$$

$$R_{(i,j)} = \frac{|K| * XY_{(i,j)} - X_{(j)} * Y_{(i,j)}}{D_{(j)}}$$

where K is the set of matches between segments of file j against file i.

In the example shown in FIG. 6, if each segment is five seconds, the time elapsed is 500 seconds. Thus, two cameras (even two cameras of same model) may be off by a certain PPM, which for synchronization of video purposes, can cause distortion in a short amount of time. The time speed ratios $R_{(i,j)}$ may be found to be accurate to about 1 part per million, and this timescale ratio, R, can be used to synchronize playout of the time media recordings so that during playout, the two media recordings do not fall out of synchrony to avoid distortion.

As another example, methods described in U.S. Pat. No. 7,627,477, entitled "Robust and invariant audio pattern matching", the entire contents of which are herein incorporated by reference, can be performed to identify the timescale ratio R. As an example, to estimate the timescale ratio R, cross-frequency ratios of variant parts of matching fingerprints are calculated, and because frequency is inversely proportional to time, a cross-time ratio is the reciprocal of the cross-frequency ratio. A cross-speed ratio R is the cross-frequency ratio (e.g., the reciprocal of the cross-time ratio).

A relationship between two media recordings can be characterized by generating a time-frequency spectrogram of the media recordings (e.g., computing a Fourier Transform to generate frequency bins in each frame), and identifying local energy peaks of the spectrogram. Information related to the local energy peaks is extracted and summarized into a list of fingerprint objects, each of which optionally includes a location field, a variant component, and an invariant component. Certain fingerprint objects derived from the spectrogram of the respective audio samples can then be matched. A relative value is determined for each pair of matched fingerprint objects, which may be, for example, a quotient or difference of logarithm of parametric values of the respective audio samples.

In one example, local pairs of spectral peaks are chosen from the spectrogram of the media recordings, and each local pair comprises a fingerprint. Similarly, local pairs of spectral peaks are chosen from the spectrogram of a known media recording, and each local pair comprises a fingerprint. Matching fingerprints between the segment and the indexed media recording are determined, and time differences between the spectral peaks for each of the segment and the media recording are calculated. For instance, a time difference between two peaks of the segment is determined and compared to a time difference between two peaks of the indexed media recording. A ratio of these two time differences can be determined and a histogram can be generated comprising such ratios (e.g., extracted from matching pairs of fingerprints). A peak of the histogram may be determined to be an actual speed ratio (e.g., ratio between the speed at which the media recording was captured compared to the reference speed at which a segment was captured). Thus, an estimate of the speed ratio R can be obtained by finding a peak in the histogram, for example, such that the peak in the histogram characterizes the relationship between the two indexed media recording and segment as a relative pitch, or, in case of linear stretch, a relative playback speed.

Alternatively, a relative value may be determined from frequency values of matching fingerprints from the segment and the indexed media recording. For instance, a frequency value of an anchor point of a pair of spectrogram peaks of the segment is determined and compared to a frequency value of an anchor point of a pair of spectrogram peaks of the media recording. A ratio of these two frequency values can be determined and a histogram can be generated comprising such ratios (e.g. extracted from matching pairs of fingerprints). A peak of the histogram may be determined to be an actual speed ratio R. In an equation, $$R_f = \frac{f_{segment}}{f_{index}}$$

where $f_{segment}$ and $f_{index}$ are variant frequency values of matching fingerprints, as described by Wang and Culbert, U.S. Pat. No. 7,627,477, the entirety of which is hereby incorporated by reference.

Thus, the timescale ratio, R, can be estimated from matched fingerprint objects using corresponding variant components from the segment and indexed media recordings. The variant component may be a frequency value determined from a local feature near the location of each fingerprint object. The timescale ratio R could be a ratio of frequencies or delta times, or some other function that results in an estimate of a global parameter used to describe the mapping between the two segment and indexed media recording. The timescale ratio R may be considered an estimate of the relative playback speed, for example.

Within some examples, the timescale ratio for the media recording is determined at multiple positions in the media recording, and this enables the timescale ratio to be updated to maintain alignment of synchronization of playout of the media recordings using the timescale ratio of each media recording determined at the multiple positions in the media recording. This enables the computing device 104 to take into account variations over time to synchronize playout over time, rather than synchronizing once for the whole video recordings.

For synchronization of playout of the media recordings, some media recordings may be started later than others depending on their mapping on the timeline. In other examples, all media recordings may be started for playback simultaneously, and the video and/or audio can be modified to fit to the master timeline. As an example, a media recording can be stretched to map to the master timeline based on being captured at a different rate than other videos.

Figure 7:
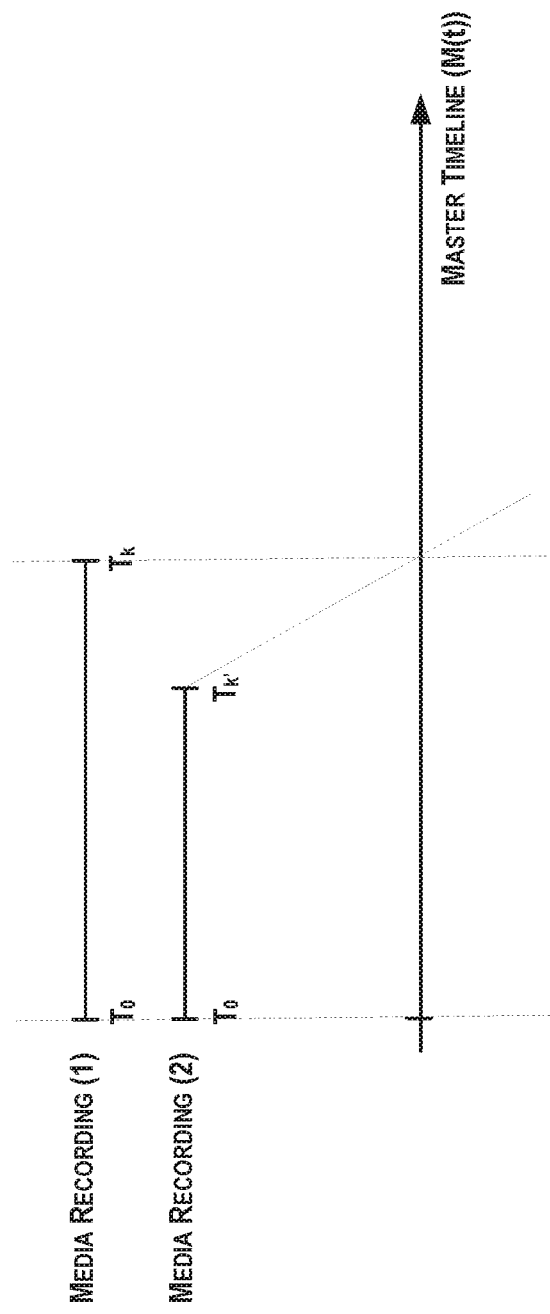
FIG. 7 is an example diagram illustrating mapping two media recordings (media recording (1) and media recording (2)) to a master timeline (M(t)), according to an example implementation.

FIG. 7 is an example diagram illustrating mapping two media recordings (media recording (1) and media recording (2)) to a master timeline (M(t)), according to an example implementation. Media recording (1) may be longer and can map directly to the timeline, however, media recording (2) is shorter and will require stretching to fit to the timeline to playout in synchrony. The stretching can occur according to the timescale ratio, and therefore, audio resampling can also be performed to map to the master timeline. An example resampling technique is described by J. O. Smith and P. Gossett, "A flexible sampling-rate conversion method," Proc. IEEE Int. Conf. Acoust., Speech, Signal Process., vol.

2, pp. 19.4.1-19.4.2, March 1984, the entirety of which is hereby incorporated by reference.

Video within media recordings can be modified to fit to the master timeline by repeating or dropping frames, or by interpolating frames. As an example, a nearest frame can be used or repeated to "stretch" the media recording (2) to fit to the master timeline.

The computing device 104 and/or the processor(s) 108 may execute the instructions to perform functions in real-time. These actions can then occur with no delay to process additional data received from other sources or through manual input. The real time processing means that the processor(s) 108 perform the actions of synchronizing playout at the time of playout. The real time processing may continually process the media recordings. By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Performing playback in real time allows the computing device 104 to playout the media recordings without altering the media recordings themselves, but rather, to perform alignment and play the media recording as they are with different stretches/offsets.

In some examples, a media recording may include a break in the recording due to being paused or stopped, and the computing device 104 can process the media recording that includes the break as separate media recordings to be synchronized in the playout of the plurality of media recordings. In such examples, when camera footage is not contiguous which can occur when the camera is not continuously recording (such as to save battery power, inadvertently paused, etc.), the discontinuous segments are mapped continuously onto the master timeline, but are treated as a separate file or segment for separate processing.

In further examples, some media recordings provided for synchronization may not be related at all, such as being recorded at different dates. In such instances, no matching segments would be found, and the media recordings would not be able to be aligned.

In some addition examples, a media recording may have repeated content, and a segment of the media recording may match at more than one location and time offset in an indexed file. This can occur when, for example, a video records audio that is repeated in the background (such as an announcement that repeats). To disambiguate the match, histogramming can be used again to determine which of the determined or calculated time offsets are most often found.

The synchronized playout of the media recordings may be performed for display on the display 128. An interface to view the synchronized playout may include functionality for fast-forward, reverse, regular, single step (single frame), or other types of playout. With the media recordings being mapped to the master timeline, any type of playout can be performed.

Figure 8:
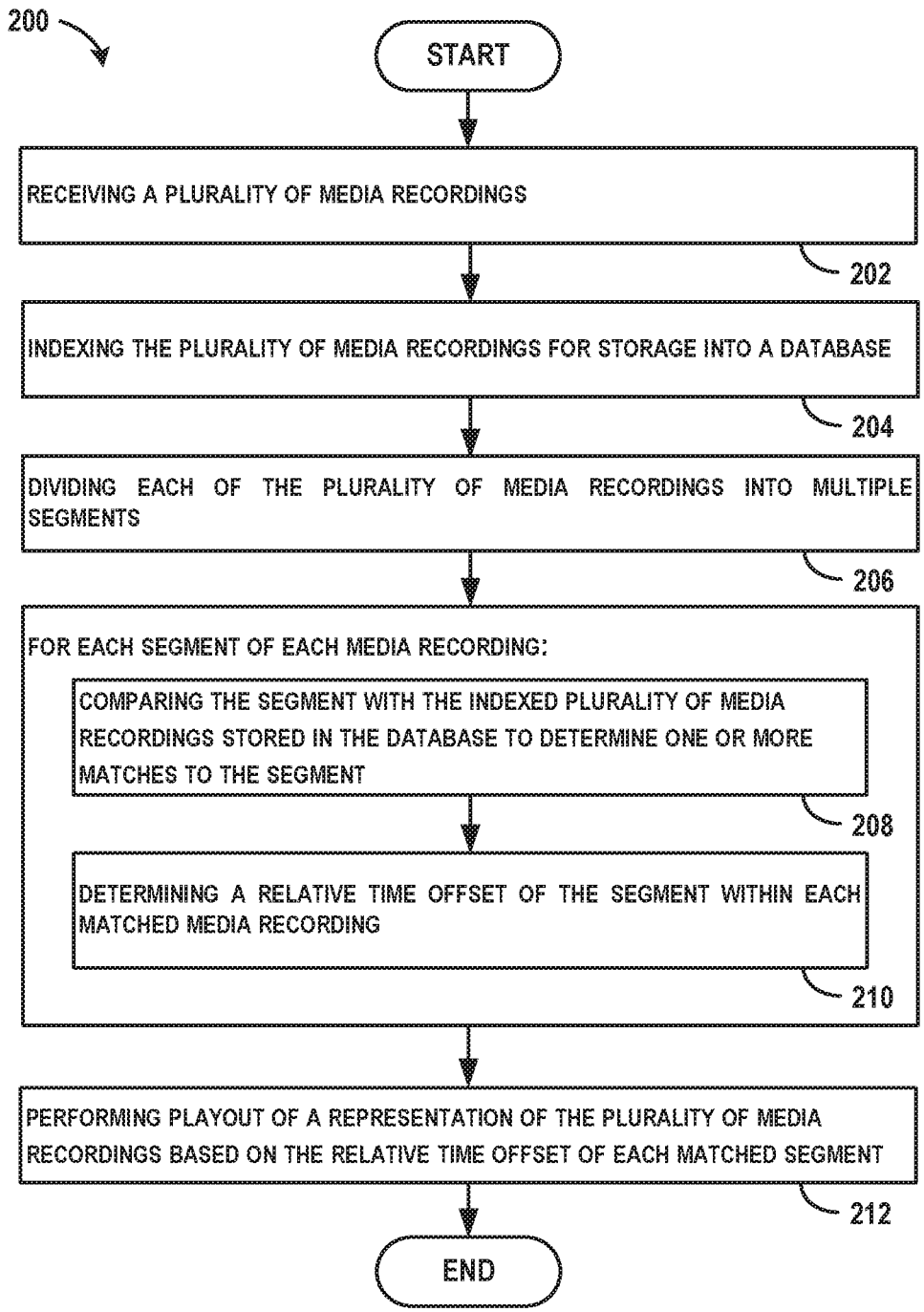
FIG. 8 shows a flowchart of an example method of performing playout of a representation of multiple media recordings based on a matching segment among the recordings, according to an example implementation.

FIG. 8 shows a flowchart of an example method of performing playout of a representation of multiple media recordings based on a matching segment among the recordings, according to an example implementation. Method 200 shown in FIG. 8 presents an embodiment of a method that could be used with the system 100 shown in FIG. 1, for example. Further, devices or systems may be used or configured to perform logical functions presented in FIG. 8. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-212. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 8, and within other processes and methods disclosed herein, may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes receiving a plurality of media recordings. In one example, the media recordings are videos and are receiving from multiple video cameras.

At block 204, the method 200 includes indexing the plurality of media recordings for storage into a database. To perform indexing, a plurality of fingerprints are determined at corresponding landmarks for each of the plurality of media recordings to identify fingerprint and landmark pairs of the plurality of media recordings.

At block 206, the method 200 includes dividing each of the plurality of media recordings into multiple segments.

At block 208, the method 200 includes for each segment of each media recording, comparing the segment with the indexed plurality of media recordings stored in the database to determine one or more matches to the segment, and at block 210, the method includes determining a relative time offset of the segment within each matched media recording.

In one example scenario, the plurality of media recordings include video recordings, and for each segment of each video recording, audio of the segment is compared with the indexed plurality of video recordings stored in the database to determine one or more matches to the segment.

At block 212, the method 200 includes performing playout of a representation of the plurality of media recordings based on the relative time offset of each matched segment. In an example where the representation includes synchronized playout of the media recordings individually, to perform playout, each of the plurality of media recordings is associated with a master timeline, and the computing device maps the relative time offset of segments within a given media recording to the master timeline. In an example where the representation includes a composite file, to perform playout, the single composite file is played.

FIG. 9 shows a flowchart of an example method that may be used with the method 200 of FIG. 8, according to an example implementation. As shown at block 214, additional functions can include stretching one or more of the plurality of media recordings to map to the master timeline based on one or more of the plurality of media recordings being captured at different rates.

FIG. 10 shows a flowchart of an example method that may be used with the method 200 of FIG. 8, according to an example implementation. As shown at block 216, additional functions can include stretching one or more of the plurality of media recordings to play back in synchrony with each other to map to the master timeline based on one or more of the plurality of media recordings being captured at different rates. In an example, stretching includes repeating playout of frames so as to lengthen the media recording.

FIG. 11 shows a flowchart of an example method that may be used with the method 200 of FIG. 8, according to an example implementation. As shown at block 218, additional functions can include interpolating one or more of the plurality of media recordings to play back in synchrony with each other to map to the master timeline based on one or more of the plurality of media recordings being captured at different rates.

FIG. 12 shows a flowchart of an example method that may be used with the method 200 of FIG. 8, according to an example implementation. As shown at block 220, additional functions can include resampling the audio to map to the master timeline based on one or more of the plurality of media recordings being captured at different rates.

FIG. 13 shows a flowchart of an example method that may be used with the method 200 of FIG. 8, according to an example implementation. As shown at block 222, additional functions can include for each media recording, determining a timescale ratio that is associated with a speed at which the media recording was captured based on a reference speed of a reference media recording, and at block 224, functions include performing playout of the representation of the plurality of media recordings based on the relative time offset of each matched segment and the timescale ratio of each media recording.

FIG. 14 shows a flowchart of an example method that may be used with the method 200 of FIG. 8, according to an example implementation. As shown at block 226, additional functions can include determining the timescale ratio for the media recording at multiple positions in the media recording.

FIG. 15 shows a flowchart of an example method that may be used with the method 200 of FIG. 8, according to an example implementation. As shown at block 228, additional functions can include maintaining alignment of synchronization of playout of the plurality of media recordings simultaneously using the timescale ratio of each media recording determined at the multiple positions in the media recording.

FIG. 16 shows a flowchart of an example method that may be used with the method 200 of FIG. 8, according to an example implementation. As shown at block 230, additional functions can include receiving location information for at least some of the plurality of media recordings indicating a location of where the plurality of media recordings were captured, and at block 232, functions include determining whether to include a given media recording within the synchronized playout based on the location information matching or being within a threshold distance to consensus location of the plurality of media recordings.

FIG. 17 shows a flowchart of an example method that may be used with the method 200 of FIG. 8, according to an example implementation. As shown at block 234, additional functions can include determining that one or more of the plurality of media recordings include a break in the recording due to being paused or stopped, and at block 236, functions include processing the one or more of the plurality of media recordings that include the break as separate media recordings to be synchronized in the playout of the plurality of media recordings.

FIG. 18 shows a flowchart of an example method that may be used with the method 200 of FIG. 8, according to an example implementation. As shown at block 238, additional functions can include for media recordings of the plurality of media recordings that have at least one matched segment to the indexed plurality of media recordings, synchronizing playout of the plurality of media recordings simultaneously.

FIG. 19 shows a flowchart of an example method that may be used with the method 200 of FIG. 8, according to an example implementation. As shown at block 240, additional functions can include synchronizing playout of the plurality of media recordings simultaneously based on matching audio segments within each media recording.

Figure 20:
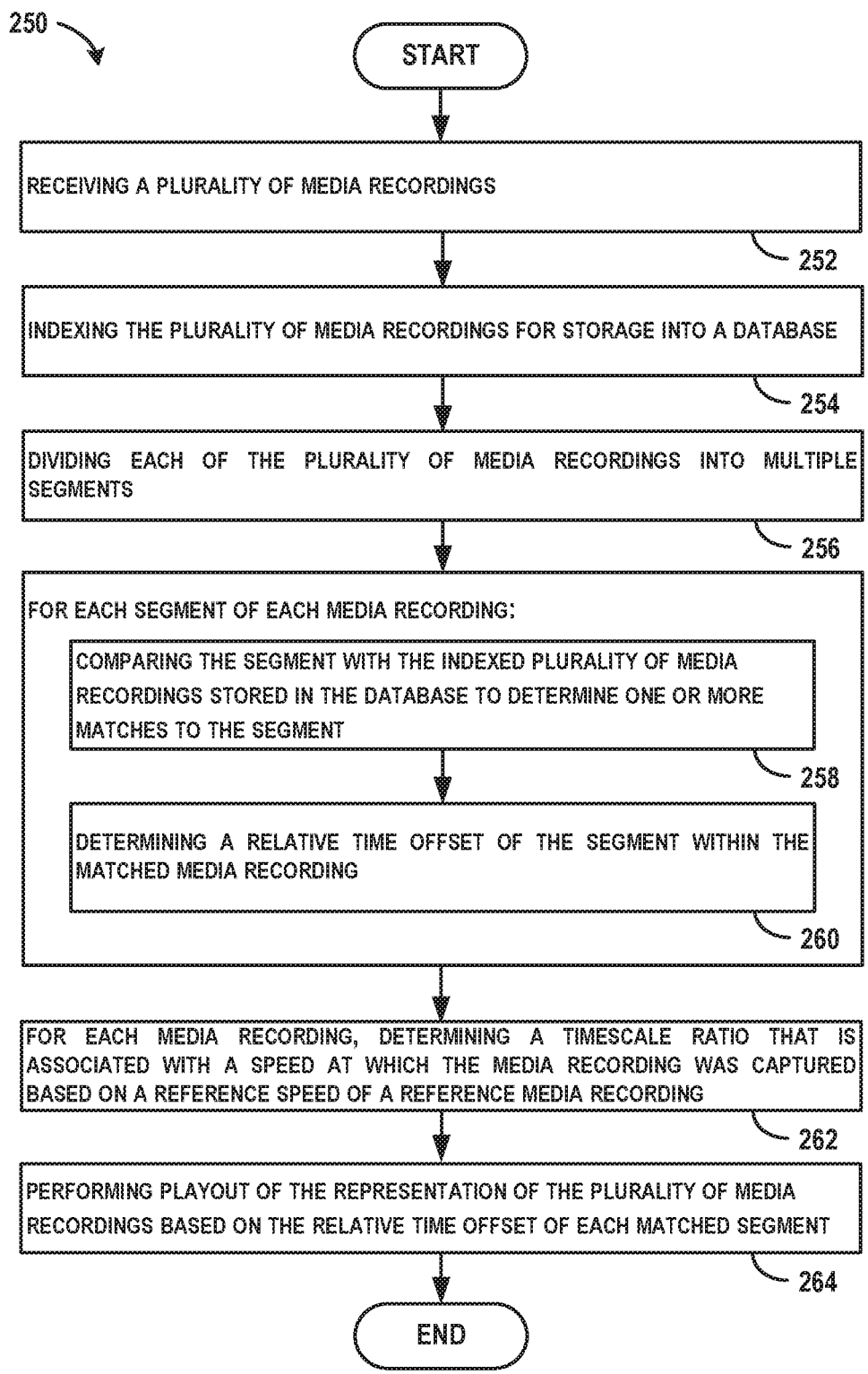
FIG. 20 shows a flowchart of another example method of performing playout of a representation of multiple media recordings based on a matching segment among the recordings, according to an example implementation.

FIG. 20 shows a flowchart of another example method of performing playout of a representation of multiple media recordings based on a matching segment among the recordings, according to an example implementation. Method 250 shown in FIG. 20 presents an embodiment of a method that could be used with the system 100 shown in FIG. 1, for example. Further, devices or systems may be used or configured to perform logical functions presented in FIG. 20. Method 250 may include one or more operations, functions, or actions as illustrated by one or more of blocks 252-264. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 252, the method 250 includes receiving a plurality of media recordings. At block 254, the method 250 includes indexing the plurality of media recordings for storage into a database. At block 256, the method 250 includes dividing each of the plurality of media recordings into multiple segments. At block 258, the method 250 includes for each segment of each media recording, comparing the segment with the indexed plurality of media recordings stored in the database to determine one or more matches to the segment, and at block 260, the functions include determining a relative time offset of the segment within the matched media recording. At block 262, the method 250 includes for each media recording, determining a timescale ratio that is associated with a speed at which the media recording was captured based on a reference speed of a reference media recording. At block 264, the method 250 includes performing playout of the representation of the plurality of media recordings based on the relative time offset of each matched segment and the timescale ratio of each media recording.

Figure 21:
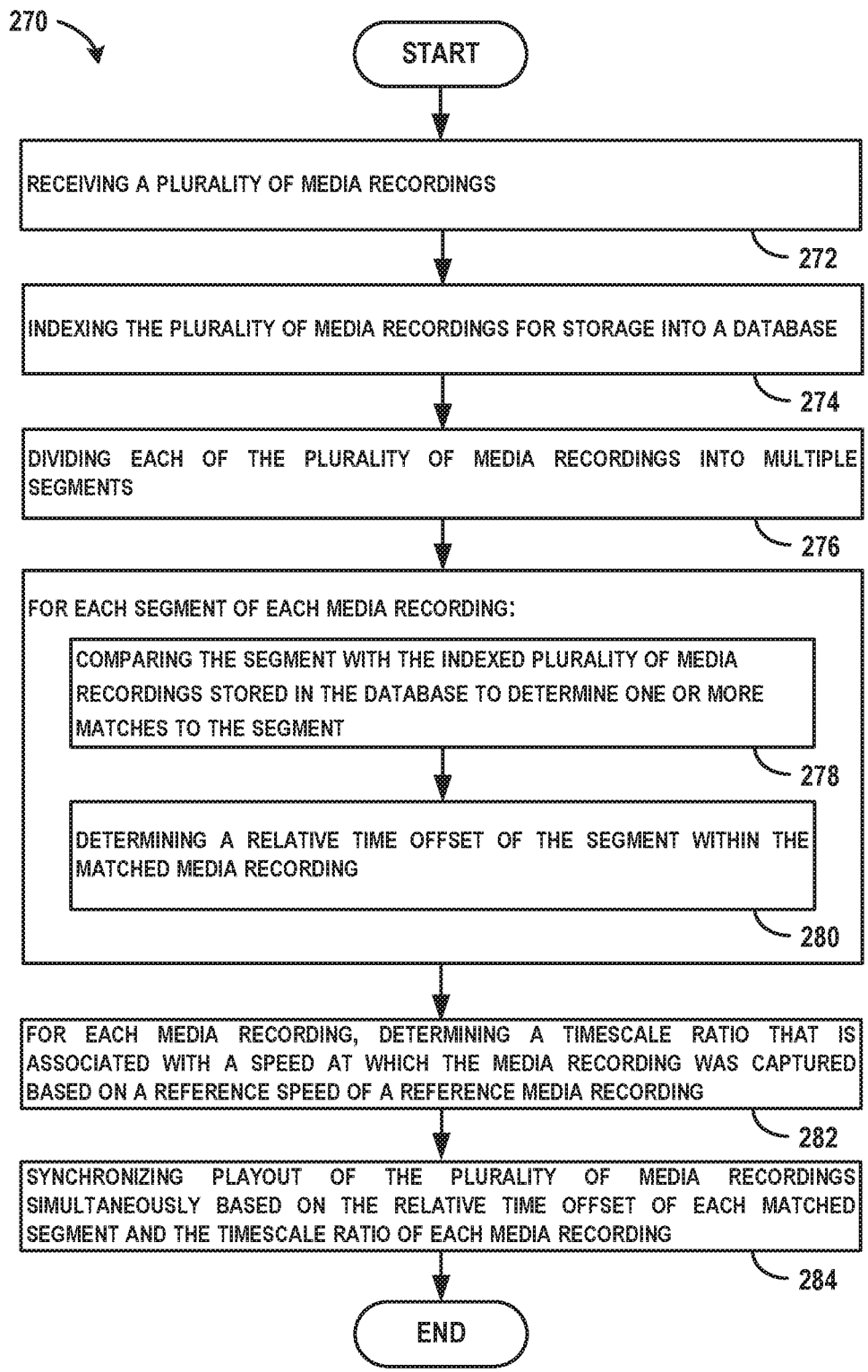
FIG. 21 shows a flowchart of another example method of performing playout of multiple media recordings based on a matching segment among the recordings, according to an example implementation.

FIG. 21 shows a flowchart of another example method of performing playout of multiple media recordings based on a matching segment among the recordings, according to an example implementation. Method 270 shown in FIG. 21 presents an embodiment of a method that could be used with the system 100 shown in FIG. 1, for example. Further, devices or systems may be used or configured to perform logical functions presented in FIG. 21. Method 270 may include one or more operations, functions, or actions as illustrated by one or more of blocks 272-284. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 272, the method 270 includes receiving a plurality of media recordings. At block 274, the method 270 includes indexing the plurality of media recordings for storage into a database. At block 276, the method 270 includes dividing each of the plurality of media recordings into multiple segments. At block 278, the method 270 includes, for each segment of each media recording, comparing the segment with the indexed plurality of media recordings stored in the database to determine one or more matches to the segment, and at block 280, functions include determining a relative time offset of the segment within the matched media recording. At block 282, the method 270 includes for each media recording, determining a timescale ratio that is associated with a speed at which the media recording was captured based on a reference speed of a reference media recording. At block 284, the method 270 includes synchronizing playout of the plurality of media recordings simultaneously based on the relative time offset of each matched segment and the timescale ratio of each media recording.

Although functions are described above as the computing device 104 performing the processing, for example to generate fingerprint and landmark pairs of the media recordings, in some examples, the video recorders 102a-d may perform initial feature extraction processing to create fingerprints and send the fingerprint and landmark pairs to the computing device 104. In this manner, more computation or identification processing can be performed by the video recorders 102a-d, rather than by the computing device 104.

Example methods described herein can be used to synchronize playout of media recordings that were captured in a vicinity of each other geographically and captured during a same or overlapping time period. Such synchronization occurs with missing or inaccurate time codes generated by the video recorders due to the example techniques described to match common audio or common anchor events in the video. The synchronization also beneficially occurs independent of start times of recording by the cameras, and in view of any noise and distortion captured by the cameras. Moreover, the synchronization occurs with inaccurate time bases used by the cameras resulting in different speeds of playout used.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
   receiving a plurality of media recordings, wherein each of the plurality of media recordings is associated with a master timeline;
   indexing the plurality of media recordings for storage into a database;
   dividing each of the plurality of media recordings into multiple segments;
   for each segment of each media recording,
   comparing the segment with the indexed plurality of media recordings stored in the database to determine one or more matches to the segment; and
   determining a relative time offset of the segment within each matched media recording;
   mapping the relative time offset of segments within a given media recording to the master timeline; and
   for each of the plurality of media recordings, determining a timescale ratio that is a speed adjustment ratio that indicates an amount that the respective media recording needs to be sped up or slowed down to map to the master timeline.

2. The method of claim 1, wherein receiving the plurality of media recordings comprises receiving a plurality of video recordings;
   wherein indexing the plurality of media recordings for storage into the database comprises indexing the plurality of video recordings; and
   for each segment of each video recording,
   comparing audio of the segment with the indexed plurality of video recordings stored in the database to determine one or more matches to the segment; and
   determining a relative time offset of the segment within each matched video recording; and
   performing playout of the representation of the plurality of video recordings based on the relative time offset of each matched segment.

3. The method of claim 1, wherein the plurality of media recordings are videos, and wherein receiving the plurality of media recordings comprises receiving the plurality of media recordings from multiple video cameras.

4. The method of claim 1, further comprising: performing playout of a representation of the plurality of media recordings based on the relative time offset of each matched segment.

5. The method of claim 1, further comprising: stretching one or more of the plurality of media recordings to map to the master timeline based on one or more of the plurality of media recordings being captured at different rates.

6. The method of claim 1, wherein the plurality of media recordings include video, and the method further comprises:
   stretching one or more of the plurality of media recordings to play back in synchrony with each other to map to the master timeline.

7. The method of claim 1, further comprising: interpolating one or more of the plurality of media recordings to play back in synchrony with each other to map to the master timeline.

8. A non-transitory computer-readable storage media having stored thereon instructions that, when executed by one or more processors, cause the one or more processors to perform functions comprising:
receiving a plurality of media recordings, wherein each of the plurality of media recordings is associated with a master timeline;
indexing the plurality of media recordings for storage into a database;
dividing each of the plurality of media recordings into multiple segments;
for each segment of each media recording,
comparing the segment with the indexed plurality of media recordings stored in the database to determine one or more matches to the segment; and
determining a relative time offset of the segment within each matched media recording;
mapping the relative time offset of segments within a given media recording to the master timeline; and
for each of the plurality of media recordings, determining a timescale ratio that is a speed adjustment ratio that indicates an amount that the respective media recording needs to be sped up or slowed down to map to the master timeline.

9. The non-transitory computer-readable storage media of claim 8, wherein the function of receiving the plurality of media recordings comprises receiving a plurality of video recordings;
wherein the function of indexing the plurality of media recordings for storage into the database comprises indexing the plurality of video recordings; and
wherein the instructions further cause the one or more processors to perform functions comprising:
for each segment of each video recording,
comparing audio of the segment with the indexed plurality of video recordings stored in the database to determine one or more matches to the segment; and
determining a relative time offset of the segment within each matched video recording; and
performing playout of the representation of the plurality of video recordings based on the relative time offset of each matched segment.

10. The non-transitory computer-readable storage media of claim 8, wherein the plurality of media recordings are videos, and wherein receiving the plurality of media recordings comprises receiving the plurality of media recordings from multiple video cameras.

11. The non-transitory computer-readable storage media of claim 8, wherein the instructions further cause the one or more processors to perform functions comprising: performing playout of a representation of the plurality of media recordings based on the relative time offset of each matched segment.

12. The non-transitory computer-readable storage media of claim 8, wherein the instructions further cause the one or more processors to perform functions comprising: stretching one or more of the plurality of media recordings to map to the master timeline.

13. The non-transitory computer-readable storage media of claim 8, wherein the plurality of media recordings include video, and wherein the instructions further cause the one or more processors to perform functions comprising: stretching one or more of the plurality of media recordings to play back in synchrony with each other to map to the master timeline based on one or more of the plurality of media recordings being captured at different rates, wherein stretching includes repeating playout of frames.

14. The non-transitory computer-readable storage media of claim 8, wherein the instructions further cause the one or more processors to perform functions comprising: interpolating one or more of the plurality of media recordings to play back in synchrony with each other to map to the master timeline.

15. A computing device comprising:
one or more processors; and
non-transitory computer-readable media storing instructions that, when executed, by the one or more processors, cause the one or more processors to perform functions comprising:
receiving a plurality of media recordings, wherein each of the plurality of media recordings is associated with a master timeline;
indexing the plurality of media recordings for storage into a database;
dividing each of the plurality of media recordings into multiple segments;
for each segment of each media recording,
comparing the segment with the indexed plurality of media recordings stored in the database to determine one or more matches to the segment; and
determining a relative time offset of the segment within each matched media recording;
mapping the relative time offset of segments within a given media recording to the master timeline; and
for each of the plurality of media recordings, determining a timescale ratio that is a speed adjustment ratio that indicates an amount that the respective media recording needs to be sped up or slowed down to map to the master timeline.

16. The computing device of claim 15, wherein the function of receiving the plurality of media recordings comprises receiving a plurality of video recordings;
wherein the function of indexing the plurality of media recordings for storage into the database comprises indexing the plurality of video recordings; and
wherein the instructions further cause the one or more processors to perform functions comprising:
for each segment of each video recording,
comparing audio of the segment with the indexed plurality of video recordings stored in the database to determine one or more matches to the segment; and
determining a relative time offset of the segment within each matched video recording; and
performing playout of the representation of the plurality of video recordings based on the relative time offset of each matched segment.

17. The computing device of claim 15, wherein the plurality of media recordings are videos, and wherein receiving the plurality of media recordings comprises receiving the plurality of media recordings from multiple video cameras.

18. The computing device of claim 15, wherein the instructions further cause the one or more processors to perform functions comprising: performing playout of a representation of the plurality of media recordings based on the relative time offset of each matched segment.

19. The computing device of claim 15, wherein the instructions further cause the one or more processors to perform functions comprising: stretching one or more of the plurality of media recordings to map to the master timeline.

20. The computing device of claim 15, wherein the instructions further cause the one or more processors to perform functions comprising: interpolating one or more of the plurality of media recordings to play back in synchrony with each other to map to the master timeline.

* * * * *